2,967,817

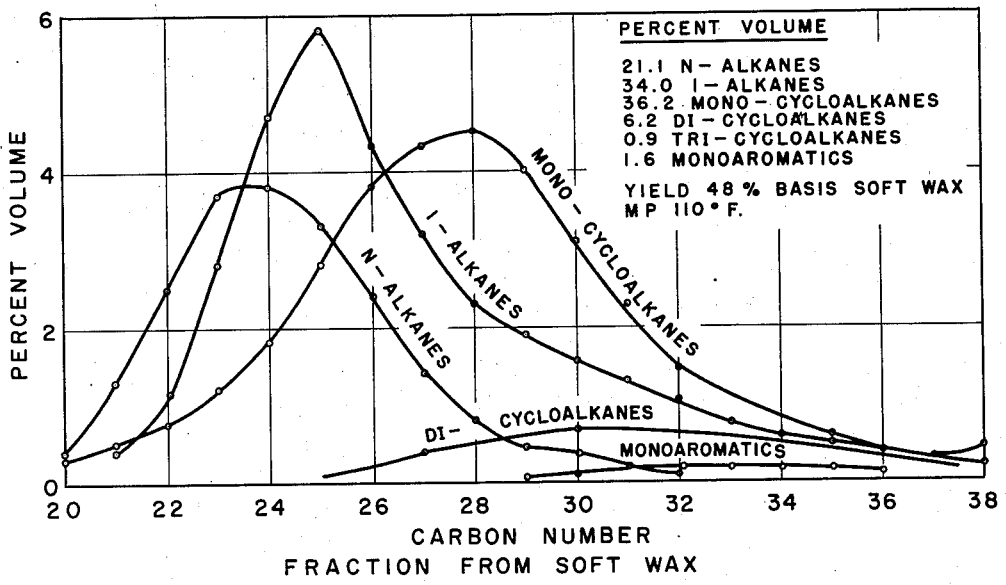
FIG. I
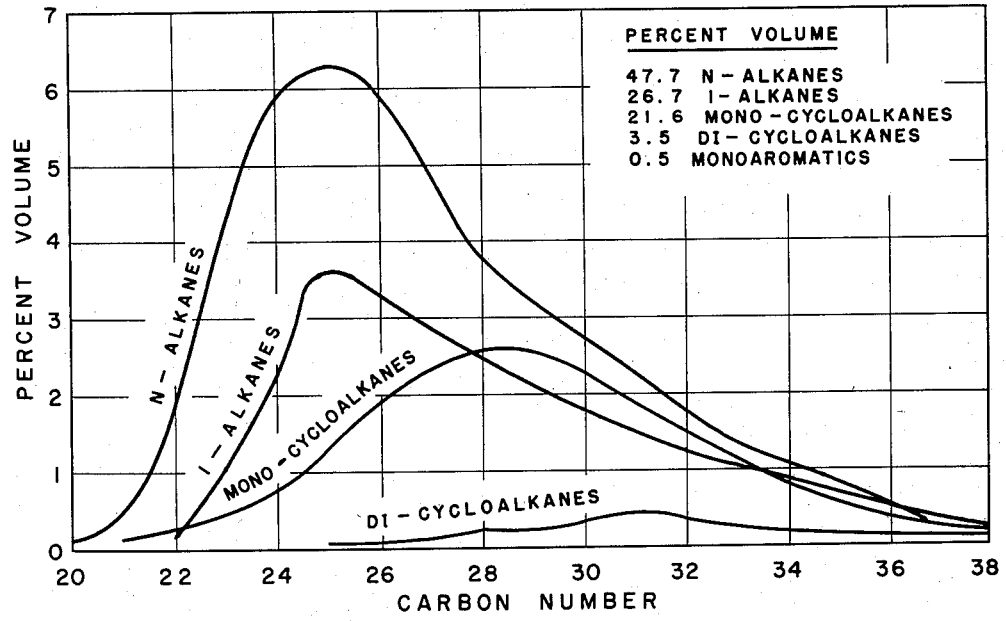
FIG. II

# United States Patent Office 2,967,817
Patented Jan. 10, 1961

WAX PRODUCT COMPRISING TWO PARAFFIN WAXES AND AN ISOPARAFFINIC-NAPHTHENIC PLASTIC WAX

Stanley Marple, Jr. and Robert J. Olson, Houston, and Delmar M. Bartay, Pasadena, Tex., assignors to Shell Oil Company, a corporation of Delaware Filed Apr. 30, 1956, Ser. No. 581,709

6 Claims. (Cl. 208—21)

This invention relates to paraffin wax products. More particularly, the invention relates to a novel paraffin hydrocarbon wax product derived from petroleum and especially suitable for incorporation in wax compositions used for the coating of food cartons and the like, as well as to a process for preparing the same.

Petroleum waxes are broadly divided into two principal classes, namely, paraffin waxes and so-called microcrystalline waxes. The paraffin waxes are usually found in the distillate lubricating oil fractions and are isolated by dewaxing procedures involving either sweating or solvent deoiling. Microcrystalline waxes normally occur in residual lubricating oil fractions and are characterized by their highly plastic and sticky consistency. In some crude oils high melting point paraffin waxes occur in conjunction with microcrystalline waxes in residual lubricating oil fractions. These may be separated by fractional crystallization.

Numerous wax products have been isolated by a wide variety of procedures for specific purposes. Since the ordinary paraffin waxes, melting in the range of about 125–150° F., are characterized by their highly crystalline and brittle nature, they must be modified by substantial proportions of other components if they are to be utilized in products suitable for use at temperatures below room temperature. While it is possible to employ substantial amounts of microcrystalline wax together with paraffin waxes for such purposes as coating of milk carton stock, this has not proved to be entirely satisfactory, especially where the wrapping of food products is involved. Low percentages of microcrystalline wax do not impart appreciable flexibility to paraffin waxes. High percentages impart flexibility but greatly increase the viscosity. Extremely low melting waxes of a specialized character are required for the preparation of cartons to be utilized in the storages of frozen foods and the like. However, such waxes, due to the requirement that they be satisfactory at temperatures below about 25° F., exhibit blocking and other undesirable features at temperatures even slightly below room temperature. On the other hand, waxes are required for the preparation of cartons for the storage of dairy products such as milk, wherein the temperatures involved are in the order of 36–45° F.

The requirements for such waxes are interrelated and complicated by the desire for extreme flexibility, high tensile strength, melting point and consistency and especially by properties such as extreme flexibility under a variety of conditions within the temperature ranges to which cartons are subjected in this particular use, as well as by the limitations imposed by the complicated machinery utilized in the manufacture of such cartons.

An object of the present invention is to provide a novel petroleum hydrocarbon paraffin wax suitable for the incorporation with other waxes for the production of carton coating compositions and the like, especially related to the storage of dairy products and especially milk. Another object of the present invention is to provide a process for the production of such a wax as well as for the production of carton coating compositions. More specific objects of the invention include the production of carton coating wax compositions exhibiting high flexibility and resistance to fracture and preferably having a relatively low viscosity at carton coating temperatures as well as exhibiting the ability to coat said carton materials evenly.

In the following description of the invention, reference will be made to Fig. I, showing the molecular size and type distribution of plastic wax; and to Fig. II, showing the molecular size and type distribution of plastic wax combined with refined paraffin wax as defined hereinafter.

Now, in accordance with this invention, means have been found for the production of a unique plastic paraffin wax having special utility because of its highly flexible characteristics but also lacking the sticky nature typical of microcrystalline waxes. The wax so produced has a melting point of about 108–117° F., a viscosity between 35 and 45 SSU at 210° F., a refractive index between about 1.4365 and 1.4500 at 70° C., an oil content less than about 0.5%, and a needle penetration at 77° F. of 40–80 mm./10.

Further in accordance with this invention, a process has been devised for the isolation of such a wax. The process comprises dewaxing a waxy lubricating oil distillate having a boiling range between about 650° F. and about 900° F. (at atmospheric pressure) to form a slack wax. The slack wax is then solvent deoiled to separate a paraffin hydrocarbon wax, preferably having a melting point of 135–145° F., from a "soft wax." The soft wax comprises mainly a mixture of oils and isoparaffinic and naphthenic crystalline waxes with less than about 15% by weight of normal paraffins, which in turn is solvent deoiled to isolate a plastic wax having the properties summarized above.

Also in accordance with the present invention, wax compositions especially suitable for the production of food cartons, and especially dairy product cartons, comprise a mixture of between about 20 and about 40 parts by weight of the described plastic crystalline wax with between about 80 and about 60 parts by weight of a refined paraffin wax having a melting point between about 130 and 138° F., to form a composition having a melting point between 127 and 133° F., and an oil content less than about 0.15%.

Again, in accordance with the present invention, improvements in the above composition can be made by the addition thereto of between about 0.5 and 5.0% of a crystalline paraffin wax having a melting point between about 165 and 195° F. The addition of these high melting paraffin waxes improves the even coating of the carton material and reduces the requirement of wax per unit of area, as long as the proportion of high melting wax is restricted within the range described. By restricting the proportion of high melting paraffin wax to the described range and further modifying the composition by the addition thereto of 0.05% and 2% by weight of a low molecular weight polyethylene, the tensile strength of the composition is substantially improved without detriment to the flexibility thereof.

The compositions of the present invention find special utility due to their flexibility at temperatures between about 36° and 75° F. Ordinary paraffin waxes normally obtained by the solvent dewaxing of lubricating oil fractions are unsatisfactory for this purpose. The addition thereto of microcrystalline wax does not provide the required degree of flexibility or resistance to fracture which manufacturers of food cartons and the like require. One of the essential features of the present invention comprises the utilization of a series of steps especially designed to eliminate the maximum amount of oil (as defined hereinafter). It has been found that if the oil content of the carton compositions exceeds about 0.2%, the flexibility and resistance to fracture at temperatures between about 36 and 70° F. is sharply degraded. Moreover, by the incorporation of the high molecular weight paraffin waxes, e.g. those melting within the range of 165–195° F., several important advantages are achieved.

In the coating of carton boards and the like, especially for use in the storage of food, i.e. dairy products, it is essential that a minimum amount of wax composition be utilized in order to keep the cost of the article as low as possible. It has been found, in accordance with one phase of the present invention, that the incorporation of less than about 5% and preferably 0.5–1% by weight of high melting paraffin wax (165–195° F.) to the mixture of refined paraffin wax and plastic wax causes a reduction of approximately 3% or more in the amount of composition required for the complete coverage of the carton material. The presence of the high melting point paraffin wax also substantially improves the "curtaining" and "serpentining" characteristics of the carton coating compositions.

"Curtaining" is the name given to flow marks on the surface of the carton caused by uneven thickness in the coating layer and is especially objectionable from the standpoint of appearance. "Serpentining" is the appearance of uncoated spots on the inner surfaces of the carton. These discontinuities in the wax film permit liquid to soak into the fiber of the carton, weakening the walls and increasing carton bulging and leakage. Beyond about 1% of the high melting point paraffin wax, the serpentining and curtaining are further improved at the expense of a decrease of flexibility of the composition. This can be overcome by limiting the amount of high melting point paraffin wax to a maximum of about 1% and supplementing it by the addition of low molecular weight polyethylenes preferably having an average molecular weight between about 1250 and 4500. The presence of the polyethylene, especially in amounts between about 0.1 and about 0.5% by weight, not only improves the serpentining and curtaining characteristics of the composition, but also causes no degradation of the flexibility properties thereof.

Since the object of the present invention is to produce waxes especially useful for incorporation in compositions utilized in the coating of food cartons and the like, the physical requirements of the several components of the composition are highly restrictive and will be described.

PLASTIC WAX

The plastic waxes forming a part of the present invention comprise essentially isoparaffinic and naphthenic crystalline waxes with less than about 22% by weight of n-paraffin waxes, preferably obtained by the following procedure: A waxy lubricating oil distillate boiling within the range from about 650° F. to about 950° F. (at atmospheric pressure) is subjected to solvent dewaxing by means of known selective dewaxing solvents. Preferably this comprises the combination of a low molecular weight aliphatic ketone and an aromatic hydrocarbon such as benzene or toluene. More specifically, a preferred pair of dewaxing solvents comprises methyl ethyl ketone and toluene in proportions of between about 2:1 to 1:2 by volume. A sufficient amount of the dewaxing solvent is employed to completely dissolve the waxy lubricating oil at temperatures in excess of about 120° F., after which the solution is cooled to a dewaxing temperature, preferably in the order of between about −15 to +15° F. At this dewaxing temperature, the slack wax is filtered or centrifuged from the dewaxed oil. The slack wax is in turn subjected to a solvent deoiling procedure preferably using the same type of deoiling solvents. The slack wax is dissolved in the solvents, preferably methyl ethyl ketone mixed with toluene, and cooled to a temperature between about 35° F. and about 50° F., at which point the refined paraffin wax is filtered. This paraffin wax is treated in accordance with known procedures, such as by repulping or washing on a filter in order to obtain a fully refined paraffin wax having a melting point between about 135 and about 145° F. The soft wax mixture left in solution in the solvent is in turn subjected to a deoiling treatment either by cooling the existing solution down to a point where the plastic waxes crystallize or by removing a sufficient amount of the solvent that a more concentrated solution of the soft wax is obtained, so that more easily attained deoiling temperatures may be employed. Preferably, the soft wax is dissolved in between about 2 and about 6 parts by weight of deoiling solvent per part of soft wax, heated to a temperature in the order of 120–160° F., and cooled to a temperature between about 30 and 46° F., at which point the plastic waxes separate and are removed by mechanical separation such as by centrifugation or filtration. In order to remove the maximum amount of contaminating oil from the precipitated waxes, it is a preferred practice to subject the waxes so obtained to washing or repulping or both within the filtration temperature range in order to obtain the desired plastic wax. The product so obtained has unique properties not found in any wax described in the prior art. It has a melting point within the range from about 108 to about 117° F., a viscosity between about 35 and 45 SSU at 210° F., a refractive index at 70° C. between about 1.4365 and 1.4500 and an oil content as determined by the standard ASTM Method of less than about 0.5%. The penetration of the wax at 77° F. is between about 40 and 80 mm./10 by ASTM Method D1321–54T.

REFINED PARAFFIN WAX

The above-described plastic waxes, while useful in the unmodified state for many purposes, are combined for the intended purpose of coating food cartons and the like with refined paraffin waxes melting between about 123 and 145° F., preferably between about 125 and 140° F. The paraffin waxes preferably predominate in normal paraffins and may comprise a single wax, but preferably, for the purpose of coating cartons and the like, consist of a mixture of relatively closely related paraffin waxes containing from 20 to 36 carbon atoms per molecule. These are usually obtained by well-known dewaxing procedures from waxy lubricating oils. In such procedures the general practice is to distill a broad lubricating oil fraction into a number of relatively narrow fractions, extract the aromatics and color bodies by clay percolation or by using solvents such as phenol or the like, and finally to dissolve the waxy lubricating oil in a solvent such as a methyl ethyl ketone, methyl isobutyl ketone, acetone or mixtures thereof, with other materials such as aromatics including benzene or toluene and the like, and cooling the wax and oil solution to a predetermined level in order to cause crystallization of the wax components. The latter are removed by centrifuging or filtering and then may be purified by a recrystallization, repulping or washing in situ. For the present purpose, they should contain the smallest possible amount of oil, preferably less than about 0.2% by weight.

HIGH MELTING PARAFFIN WAXES

The crystalline paraffin waxes referred to by this title are high molecular weight normal and isoparaffin hydrocarbons combined with 0–15% aromatic or cycloalkane hydrocarbons. The major criterion comprises the minimum melting point of these particular waxes, which must be at least 165° F. and, preferably, is higher than about 170° F., usually 170–185° F. They may be obtained by various procedures from either heavy lubricating oil distillates or from residual wax-bearing fractions.

In obtaining these waxes from lubricating oil distillates, the following procedure may be employed: The crude oil, after being topped to remove light oil fractions for motor fuels and the like, is further distilled to give low and medium viscosity lubricating oil fractions and a high viscosity lubricating oil fraction, the latter having a Saybolt Universal viscosity at 210° F. of at least 75 seconds and usually between about 75 and 160 seconds. The high viscosity lubricating oil distillate (preferably after acid treatment and/or solvent extraction) is diluted with a solvent such as naphtha and chilled to about −25° F. to produce a precipitated wax leaving lubricating oil dissolved in the solvent. The precipitated wax may be removed by suitable means such as filter pressing. The wax so obtained (slack wax) has a melting point of about 130–160° F. and contains about 40–60% oil. It is dissolved in a suitable solvent, such as oleum spirits, and chilled to about 60–80° F. (preferably about 70° F.) to crystallize therefrom a paraffin wax having a melting point of at least 165° F. and generally above 170° F. Still higher melting point waxes may be obtained by recrystallization of this material. Crude oils from the Salt Creek Field of Wyoming, for example, contain a relatively high proportion of such waxes.

While these waxes may be obtained from lubricating oil distillates, a preferred source comprises residual oils obtained during the distillation of waxy lubricating oil fractions. In accordance with this preferred method, a portion of the residual slack wax may be deoiled such as by dissolving it in solvents, including methyl ethyl ketone, benzene or toluene, using for example 5–8 volumes of solvent to one volume of wax at a solution temperature of about 110–160° F., preferably about 140° F., cooling the solution to a suitable temperature, such as 40–75° F., preferably about 60° F., to precipitate the waxes while leaving the oily components and a portion of the lower melting wax constituents dissolved in the solvent, filtering the slurry at about 40–75° F., preferably about 60° F., and washing the wax with a further quantity of solvent to recover a "primary microcrystalline wax" having a melting point of about 150–170° F., usually about 160° F. (ASTM Method D938 M.P.). The "primary microcrystalline wax" is then segregated into two or more wax products by dissolving it in from about 5 to about 10, suitably about 7, volumes of a dewaxing solvent at a suitable elevated temperature to obtain a complete solution, chilling the solution to a temperature usually between about 85° and about 125° F. to precipitate substantially only the higher melting point waxes which are hard paraffin waxes of a highly crystalline character from the solution of the truly plastic microcrystalline waxes. By varying the filtration temperature, the melting point of the precipitated waxes may be controlled. The higher the filtration temperature, the higher the melting point of the hard crystalline paraffin wax. Details of the latter process are described in U.S. Patent 2,688,140 to Karekin G. Arabian.

These high melting point waxes possess all of the characteristics, such as specific gravity, refractive index and the like, to indicate that they are high molecular weight varieties of paraffin waxes having either a straight-chain or isoparaffin configuration with less than 15% by weight of aromatic or cycloalkane hydrocarbons. They are sharply distinguished from the microcrystalline (or amorphous) waxes in that the latter are naphthenic or highly branched in character and possess a plastic nature, as contrasted with the hard, brittle character of these high melting point paraffin waxes with which the present invention is concerned.

POLYETHYLENES

Another one of the ingredients to be employed in amounts preferably between 0.05 and 2% (0.05–1% optimum) by weight of the final composition comprises ethylene polymers having molecular weights preferably between 1250 and 4500 on the average, although polymers of higher or lower molecular weights may be utilized.

The preferred proportion is between about 0.1% and about 0.5%, an amount between about 0.125 and about 0.25% being highly effective when the molecular weight is between about 1500 and 2500. The preferred products have melting points between about 88 and about 160° C., and viscosities at 140° C. of between about 65 and 250 Seconds Furol.

Other ingredients which may be employed in minor degrees include microcrystalline waxes as long as no more than about 5% by weight is employed. Preferably these have melting points within the range from about 145 to 180° F., and products having melting points between about 160 and 175° F. are most suitable.

The following examples illustrate the production of the plastic wax forming an essential ingredient of the carton coating wax compositions described herewith.

Example I

The soft wax utilized in the preparation of the plastic wax was obtained as the by-product of the solvent deoiling of a slack wax from the dewaxing of a distillate lubricating oil. The refined paraffin wax recovered during the deoiling procedure had a melting point of about 139° F. The filtrate from the solvent deoiling from which this wax was obtained was dissolved at a temperature of about 150° F. in four times its weight of a solvent consisting of approximately equal volumes of methyl ethyl ketone and toluene. The solution was cooled to 30° F. and filtered. The separated wax was washed on the filter with three times the soft wax weight of the dewaxing solvent. The separated wax was repulped at a temperature of 30° F., using 1.4 parts by weight (based on the original soft wax charge) of the dewaxing solvent at 30° F. The yield of separated wax, after stripping off the solvent, amounted to 47.8% of the wax charged. The finished wax, after decolorizing by passing over decolorizing clay, had the following properties:

| | |
|---|---|
| Melting point ° F | 109.5 |
| ASTM oil content percent | 0.5 |
| Penetration at 77° F. (ASTM D1321–54T) | 72 mm./10 |
| Color, Saybolt | +30 |

Example II

The above process was substantially repeated, using filtration and repulp temperatures of 40° F., in order to obtain a 36.8% yield of a plastic wax having the following properties:

| | |
|---|---|
| Melting point ° F | 113.5 |
| ASTM oil content percent | 0.2 |
| Penetration at 77° F. | 47 mm./10 |
| Color, Saybolt | +30 |

Example III

The above-described series of steps was repeated, the soft wax charge being dissolved in 1.6 times its weight of 50–50 methyl ethyl ketone-toluene. The solution was cooled to 90° F. and 2.7 charge weights of solvent added, the latter solvent being at a temperature of 50° F. The solution was cooled to 32° F. and filtered. The wax cake was washed with 3.3 charge weights of solvent. The separated wax was repulped with 1.3 charge weights of solvent, filtered at a temperature of 38° F., and washed with 2.7 charge weights of solvent. A yield of wax of 47.8% based on the charge was obtained. The separated wax, after decolorizing by passing over decolorizing clay, had the following properties:

| | |
|---|---|
| Melting point ° F | 112.8 |
| ASTM oil content percent | 0.5 |
| Density, g. per cc. at 70° C. | 0.7845 |
| Refractive index at 70° C. | 1.4378 |
| Penetration at 77° F. | 72 mm./10 |
| Viscosity, SSU, at 210° F. | 40.7 |
| Color, Saybolt | +30 |

Example IV

The process described in Example III was substantially repeated, using a filtration temperature of 41° F. for the initial separation and a repulp filtration temperature of 46° F. A yield of 34% of wax was obtained based on the soft wax charge. After decolorizing over decolorizing clay, this wax had the following properties:

| | |
|---|---|
| Melting point ° F | 115.9 |
| Oil content percent | 0.5 |
| Density at 70° C. | 0.7833 |
| Refractive index at 70° C. | 1.4370 |
| Penetration at 77° F. | 52 mm./10 |
| Viscosity, SSU, at 210° F. | 42.8 |
| Color, Saybolt | +30 |

The plastic wax obtained by the described process is extremely flexible at room temperature. A specimen of the wax 0.5 inch thick and 0.5 inch wide may be flexed at 75° F. more than 90° repeatedly without breaking. This plasticity is apparently related to the relatively high concentration of isoparaffin and cycloparaffin hydrocarbons and to the low concentration of normal paraffin hydrocarbons present in the wax. The hydrocarbon type composition and carbon number distribution of a typical sample of the plastic wax is shown in Fig. I.

While ordinary distillate parafin waxes of crystalline structure may be obtained within the desired melting point range of 123 to 145° F., these cannot be used to any satisfactory extent for the coating of certain dairy product cartons. This is due to the fact that such paraffin waxes as they normally are obtained exhibit poor resistance to fracture upon chilling and exhibit no flexibility even at 77° F., in spite of the fact that they can be purified to contain only traces of oil. The following are several examples of typical paraffin waxes obtained by the dewaxing of lubricating oil distillates:

TABLE I.—PROPERTIES OF REFINED PARAFFIN WAXES PREDOMINATING IN NORMAL PARAFFINS

| Sample No | 1 | 2 | 3 |
|---|---|---|---|
| Properties: | | | |
| Melting Point, ° F., D87 | 126.0 | 130.6 | 139.5 |
| Viscosity at 175° F., cs* | 3.3 | 3.7 | 4.6 |
| Tensile strength, 77° F., p.s.i. | 310 | 365 | 384 |
| Color, Saybolt | +30 | +30 | +30 |
| Odor, HWT 54 [1] | None | None | None |
| Taste, HWT 56 [2] | None | None | None |
| Fracture Resistance on Chilling [3], inches of cracks | 40 | 30 | 20 |
| Apparent Flexibility [4], 77° F | No bend | No bend | No bend |
| Oil Content, Percent w | 0.1 | 0.2 | nil |

*Converted from Saybolt viscosity.
[1] The odor test designated as HWT 54 is performed by mixing 60 grams of wax and 120 grams of distilled water in a beaker, covering with a watch glass, heating to boiling, removing from the heat and checking the uncovered beaker for odor.
[2] The taste test designated as HWT 56 comprised chewing a sample of the wax, the tester reporting whether the wax appeared to have no taste or an oily or musty taste.
[3] Five ml. of filtered wax at 230° F. is pipetted into each of four milk carton container bottoms. The bottoms may be placed in an oven at 230° F. for a few moments if the wax does not flow sufficiently. The bottoms are then placed on a ¼" flat plate supported on rubber stoppers to insure good air circulation and uniform cooling. These bottoms are allowed to condition for 1 hour at 70° F. and 50% relative humidity. After conditioning, the bottoms are chilled in 34° F. to 36° F. water for 60 seconds and examined for fractures. Fracture resistance may be reported as the total number of inches of fractures, which may be noted with a map mileage gauge in the case of large fractures. In the case of total crazing, the sample may possibly be evaluated on the basis of per cent fractures or other convenient means.
[4] This is a qualitative test made by flexing a ½" thick, dumb-bell shaped wax specimen from a Perkins tensile strength mold by hand at room temperature and observing its apparent flexibility. With the predominantly normal paraffin waxes, only slight flexing can occur without fracture. Comparisons are made between the wax in question and an acceptable wax.

In order to obtain a wax passing the fracture resistance test as described and the apparent flexibility test, compositions according to this invention are provided by the incorporation of greater than about 20 parts (usually 25–40 parts) of the above-described plastic waxes with fewer than about 80 parts (usually 75–60 parts) by weight of refined paraffin waxes having melting points between about 123 and 145° F. A typical wax composition meeting these limitations comprises the mixture of 30 parts by weight of a plastic wax obtained as described hereinbefore and having a melting point of 113° F. with 50 parts by weight of a refined paraffin wax having a melting point of 139.5° F. and 20 parts by weight of a refined paraffin wax having a melting point of 126° F. This wax had the following properties:

| | |
|---|---|
| M.P., ° F., D87 | 130. |
| Viscosity, cs., at 175° F. | 5.8. |
| Tensile strength, p.s.i. at 77° F. | 312. |
| Color, Saybolt | +30 |
| Odor | None. |
| Taste | None. |
| Oil content, percent w. | 0.1. |
| Fracture resistance | No cracks. |
| Apparent flexibility at 77° F. | Pass. |

It is noteworthy that the wax passes both the fracture resistance and apparent flexibility tests, thus indicating its suitability for use as a milk carton wax. Fig. II gives the analysis with respect to hydrocarbon type and carbon number distribution of the composition described above. As will be seen from Fig. II, the wax composition described above contains a large proportion of normal alkanes and also contains approximately 39% by weight of the total waxes in molecules having from about $C_{20}$ to about $C_{26}$. This compares with the plastic wax described in Fig. I, which indicates that the plastic wax contained almost 48% by weight of waxes having from 20 to 26 carbon atoms per molecule, but containing only a small percentage of normal alkanes substantially all of which have less than 26 carbon atoms per molecule.

The composition described in the table given above was utilized for the coating of dairy cartons. It was observed that while this was satisfactory in the main part, it fell short of the desired results with respect to both serpentining and curtaining. In order to correct these two properties but at the same time avoid any detrimental effect upon the tensile strength or flexibility of the composition, 1% by weight of a high melting point paraffin wax having a melting point of about 171° F. was added to the above-described composition and resulted in a dairy carton wax having the following properties:

| | |
|---|---|
| M.P., ° F., D87 | 129.6 |
| Tensile strength, p.s.i., at 77° F. | 285 |
| Viscosity, cs., at 175° F. | 6.3 |
| Color, Saybolt | +28 |
| Odor | Nil |
| Taste | Nil |
| Oil content, percent w. | 0.1 |
| Fracture resistance, revised, inches of cracks | 1 |
| Apparent flexibility | Bends |

Still further improvements in the resistance to serpentining and curtaining of carton wax compositions were obtained by adding to the latter composition either 0.125 or 0.25% of a polyethylene having an average molecular weight of about 2000. The resulting compositions had the properties given in the table below:

TABLE II

| Sample | A | B |
|---|---|---|
| Percent Polyethylene | 0.125 | 0.25 |
| M.P., ° F., D87 | 129.6 | 129.9 |
| Oil Content, Percent w | 0.1 | nil |
| Viscosity, cs. at 175° F | 5.8 | 5.8 |
| Tensile Strength, p.s.i., at 73° F | 270 | 220 |
| Fracture Resistance on Chilling, Inches of Cracks | 0.5 | 1.0 |
| Apparent Flexibility, 77° F | Bends | Bends |

One of the principal advantages gained by the described process for the preparation of the carton wax composition comprises the elimination of substantially all of the oil with which the waxes were originally associated. The elimination of substantially all of the oil from the final carton compositions was accomplished by the separate deoiling of the slack wax and of the soft wax obtained therefrom. Attempts were made to obtain the desired wax composition by simply cooling the slack wax in its deoiling solvent to a lower temperature in order to crystallize some of the plastic waxes together with the ordinary crystalline paraffin waxes. However, it was found that difficulty occurred in separating the wax from the oil due to the high viscosity of the oil at low temperatures. Much sharper separation and lower oil contents were obtained by isolating the ordinary paraffin waxes at dewaxing temperatures in the order of between about 35° F. and 50° F. and of separately deoiling the soft wax separated during this deoiling procedure. It was essential to the success of the carton wax compositions that the oil content should be no more than about 0.5% by weight. If greater amounts of oil were present, then the waxes were unsatisfactory for the desired purpose with respect to fracture resistance upon chilling. Other means of obtaining the combined composition might be to distill a slack wax or a waxy lubricating oil under vacuum or low pressure in an effort to eliminate most of the oil by this means. However, it was found in attempting such a procedure that substantial amounts of oil remained in the wax, while some of the most flexible plastic wax components passed overhead during the distillation. The resulting wax composition, while having a reasonable spread in molecular species, was too high in oil content to be satisfactory, especially with respect to fracture resistance upon chilling.

We claim as our invention:

1. As a new composition of matter, a wax composition comprising 0.5–5% by weight of a paraffin wax of crystalline structure having a melting point between about 165° F. and about 195° F., between about 0.05% and about 1% by weight of polyethylene having a molecular weight of at least 1000, between about 20% and about 35% by weight of isoparaffin-naphthenic distillate wax of crystalline structure having a melting point between 108° F. and 117° F. and at least 60% by weight of a paraffin hydrocarbon wax of a crystalline structure having a melting point between about 123 and 145° F., the oil content of said composition being less than about 0.2%.

2. As a new composition of matter, a wax composition comprising 0.75–1.5% by weight of a paraffin wax of crystalline structure having a melting point between about 170° F. and about 185° F., between about 0.1% and about 0.5% by weight of polyethylene having an average molecular weight between about 1250 and about 4500, between about 25% and about 40% by weight of a distillate plastic crystalline wax having a melting point between about 108 and about 117° F. and a viscosity between about 35 and about 45 SSU at 210° F., and at least 65% by weight of paraffin wax of a crystalline structure and having a melting point between 125 and about 140° F., the oil content of said composition being less than about 0.15%.

3. As a new composition of matter, a wax composition especially suitable for coating of dairy food cartons and the like comprising 0.8–1.5% by weight of a paraffin wax of crystalline structure having a melting point between about 170 and about 185° F., between about 0.125 and about 0.25% by weight of polyethylene having an average molecular weight between about 1500 and about 2500, between about 27.5 and about 31.5% by weight of a distillate plastic crystalline wax having a melting point between about 110° F. and about 113° F., a viscosity between about 37 and 42 SSU at 210° F., and a refractive index between about 1.4365 and about 1.4500 at 70° C., and at least about 68% by weight of a crystalline paraffin wax having a melting point between about 130° F. and about 138° F., said composition having a melting point of 127–133° F., and an oil content less than about 0.15%.

4. As a new composition of matter, a wax composition comprising 0.5–5% by weight of a paraffin wax of crystalline structure having a melting point between about 165° F. and about 195° F., between about 20% and about 35% by weight of isoparaffin-naphthenic distillate wax of crystalline structure having a melting point between 108° F. and 117° F. and at least 60% by weight of a paraffin hydrocarbon wax of a crystalline structure having a melting point between about 123 and 145° F., the oil content of said composition being less than about 0.2%.

5. As a new composition of matter, a wax composition comprising 0.75–1.5% by weight of a paraffin wax of crystalline structure having a melting point between about 170° F. and about 185° F., between about 25% and about 32% by weight of a distillate plastic crystalline wax having a melting point between about 108 and about 115° F. and a viscosity between about 35 and about 45 SSU at 210° F., and at least 65% by weight of paraffin wax of a crystalline structure and having a melting point between 125 and about 140° F., the oil content of said composition being less than about 0.15%.

6. As a new composition of matter, a wax composition especially suitable for coating of dairy food cartons and the like comprising 0.8–1.5% by weight of a paraffin wax of crystalline structure having a melting point between about 170 and about 185° F., between about 27.5 and about 31.5% by weight of a distillate plastic crystalline wax having a melting point between about 110° F. and about 113° F., a viscosity between about 37 and 42 SSU at 210° F. and a refractive index between about 1.4365 and about 1.4500 at 70° C., and at least about 68% by weight of a crystalline paraffin wax having a melting point between about 130° F. and about 138° F., said composition having a melting point of 127–133° F., and an oil content less than about 0.15%.

References Cited in the file of this patent

UNITED STATES PATENTS

| | | |
|---|---|---|
| 1,937,518 | Henderson et al. | Dec. 5, 1933 |
| 2,045,567 | Beynon | June 30, 1936 |
| 2,054,416 | Govers | Sept. 15, 1936 |
| 2,127,668 | Adams et al. | Aug. 23, 1938 |
| 2,194,968 | Bray et al. | Mar. 26, 1940 |
| 2,229,659 | Carr | Jan. 28, 1941 |
| 2,301,801 | Burk et al. | Nov. 10, 1942 |
| 2,595,468 | Kiersted | May 6, 1952 |
| 2,660,553 | Knox | Nov. 24, 1953 |
| 2,668,140 | Arabian | Feb. 2, 1954 |
| 2,670,318 | Halamka et al. | Feb. 23, 1954 |
| 2,670,323 | Hunter et al. | Feb. 23, 1954 |
| 2,728,735 | Anderson | Dec. 27, 1955 |
| 2,733,225 | Smith | Jan. 31, 1956 |
| 2,758,100 | Bailly et al. | Aug. 7, 1956 |